Patented Apr. 12, 1932

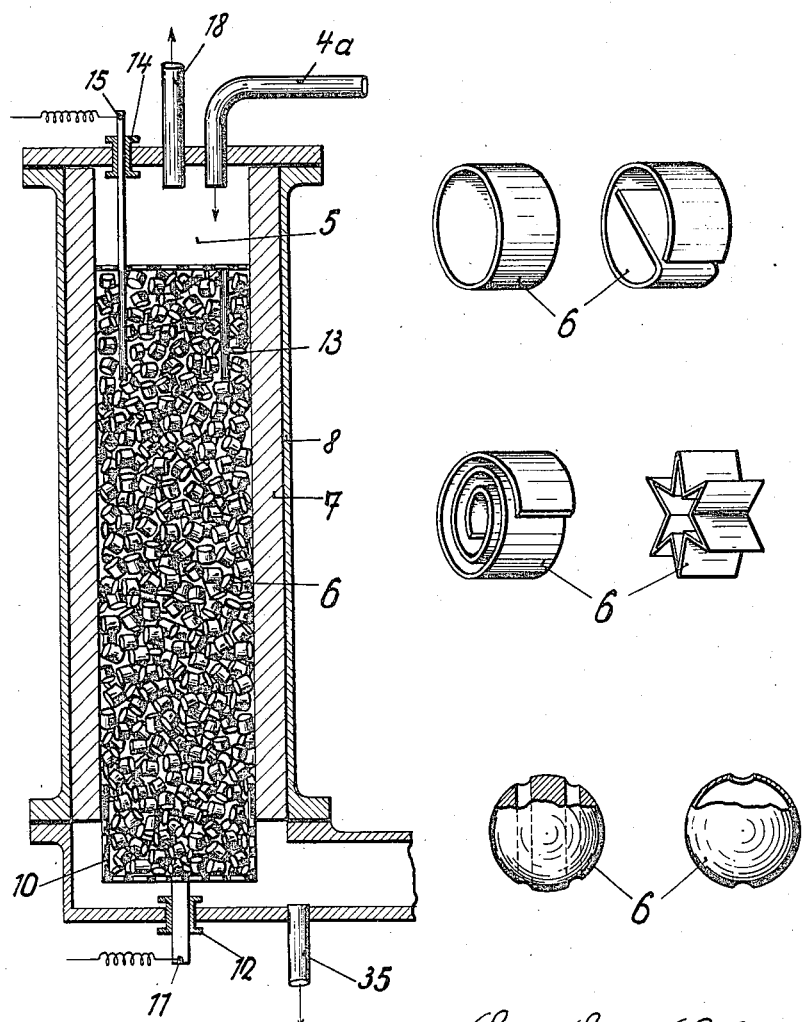

1,853,688

UNITED STATES PATENT OFFICE

LOUIS GEORG LEFFER, OF KAPELLEN-WEVELINGHOVEN, GERMANY

APPARATUS FOR CONVERTING HYDROCARBONS

Application filed November 1, 1928, Serial No. 316,591, and in Germany November 5, 1927.

My invention relates to an apparatus for converting hydro-carbons and it particularly relates to an apparatus for converting hydro-carbons into products, of which one part will boil at a higher and another part will boil at a lower point than the applied raw material.

It is another object of the invention to provide an apparatus which can be so regulated that no carbon will become free during the conversion and that the applied raw material, for instance such as residue oils, will entirely be converted during the process into hydro-carbon oil of good anti-knocking properties.

It is another object of the invention to provide an apparatus in which the conversion takes place at a lower temperature than that maintained in the apparatus of this type known up to now, and that the conversion may be carried out not only at atmospheric pressure but also above as well as below the same.

These and other objects of the invention, which will become more apparent in the way the description proceeds, are obtained by passing the material to be converted over a very large, electrically heated surface so that in a peculiar way very thin layers of the raw material are exposed to a uniform and constant supply of heat. The manner of passing the hydro carbons to be converted through the heated zone allows to retain them there sufficiently long until the desired conversion has taken place. The conversion may be carried out without applying pressure. In passing the hydro-carbons through the heated zone a moving agent is applied which will carry off the formed light hydro carbons immediately after their formation in the reaction zone.

The new process forming the subject matter of this invention is also characterized insofar that the same goes on under uniform pressure and that the generated high and low boiling parts of the hydro-carbons are separated during the process and can be collected immediately as merchantable products.

According to my process the hydro-carbons to be converted are uniformly exposed to the heating in thin layers. The means to bring this about consists in the use of hollow bodies offering great surfaces; these bodies are placed in a receptacle made of electrically non-conductive material and act as resistors when connected with the bus bars of a source of an electric current.

It is not so much the function of these bodies as a resistor which stands in the foreground, but the relation of their size and shape to their capacity for producing heat as conductors of electricity. It is primarily their uniform shape and hollow construction which plays an essential part in the present invention for though I am aware that resistance bodies have been used for similar purposes, the resistors of the prior art have not given satisfactory results.

In all the resistors of the prior art it has been overlooked to give attention to this uniformity in the make up and shape of these resistors; often one has tried to produce an electrically heated zone by introducing more or less big lumps of electrically conductive material, which, though to a great extent of one conductive element, nevertheless was very heterogeneous in its composition; often it contained in its mass nests of material greatly different in conductivity so that zones were formed either lower or higher in temperature because the material of that particular zone was, respectively, either a better or poorer conductor of electricity than the surrounding material.

Usually the temperature of the electrically heated zone was very high and it was therefor often assumed that the heat would soon spread evenly through the mass; moreover, it was often held in view of the high temperature that a number of degrees more or less were of no material influence on the outcome of the reaction; and if an occasional measurment of the temperature showed substantially the temperature necessary for the operation of the process, everything was considered in order.

The situation is, however, by no means so simple. I have found that in the prior art one has completely overlooked to consider the effect which is exerted on the temperature of the conversion zone if the resistor bodies are of haphazard, irregular form because then the heating effect is often anything else but suitable for the purpose of converting hydrocarbons.

Much of the resistor material of the prior art is applied in the form of solids having an egg, or nut shape, or more or less oval shape. These materials are, moreover, often hetrogeneous in their composition, and I have found that the differences in temperature, caused by such solid, irregular shapes, are in fact the source of the difficulties in the conversion of hydrocarbons, and are responsible for the greatly varying nature and quantity of the products. For these difficulties, arising apparently under strictly the same conditions, there was formerly no explanation and often variations in the composition of the applied oil were held responsible.

On the ground of observations in many years practice I have found that great differences in temperature may exist in the electrically heated conversion zones and that the difficulties in the nature and quantity of the products are only due to such differences in temperature.

I found that even a relatively small percentage of for instance oval shaped bodies in a zone, formed of bodies having haphazard shapes, is sufficient to prevent a zone of an even temperature in all its parts. I found that such oval bodies contact at their pointed ends with the adjoining bodies; they become, therefore, extremely highly heated at the points of contact on account of the narrow cross-section at these points while the relatively thick middle part of the body easily conducts the electric current and therefore is left much below the temperature required for the proper operation of the process. It is evident that such an unevenly heated resistor body causes to go on as many different reactions with the hydrocarbon gas as there are zones of different temperature on the resistor body. To bring about such an undesirable result it is by no means necessary that the whole conversion zone is made up of such irregularly sized and shaped resistor bodies, a rather low percentage of the same is perfectly sufficient to turn the results very unfavorably. As to the size of my resistor bodies I wish to say that the drawing shows the same in a somewhat enlarged size; in a converter of small dimensions the resistor bodies have approximately one half the size shown in the drawing. It is understood, of course, that in converters of considerable dimensions, as applied in actual practice, the size of the resistor bodies must be enlarged in order to make it possible that the bodies in the lower zones may carry the burden of the whole column. This does not means that the thickness of the sheet is increased in the same proportion, this dimension being left practically unchanged so as to bring about as soon as possible the elevation of its temperature by the resistance the sheet of resistor material gives even to a current of very low strength. The resistor material is secondary to the factor of thickness and equal size of the resistor, any suitable metal, not seriously affected by the hydrocarbons or its impurities, such as sulfur, or any other material, like graphite, coal and the like may be used for making up the resistors in their respective size and thickness.

At the upper and lower end of the receptacle there are provided electrodes of various shapes, such as perforated plates, sieves, or the like, suitably connected with the current. In the same receptacle, henceforth simply called a "converter", is introduced the raw material to be treated and the generated products are recovered partly as liquid, partly as vapor.

The accompanying drawing shows diagrammatically the converter used in my process and some of the shapes which the resistance bodies may have.

5 is a cylindrical receptacle of electrically non-conductive material 7, for instance such as quartz, surrounded by an iron mantle 8 and filled with the said resisters, or bodies 6, which by way of example I choose to have the shape of hollow cylinders each of which is of the same diameter, height and thickness of the walls. At the upper and lower end of this converter 5 there are sieve-like electrodes 10 and 13 connected with the current at 11 and 15. After the current was turned on and the converter 5 has arrived at the temperature at which I intend to operate my process, I introduce the hydro-carbon, to be treated, in the form of oil or as vapor at 4ª in the usual way; the generated products are conducted off through exit 18 to a dephlegmator and cooler (not shown). The heavier liquid constituents of the obtained products collect at the bottom and can be removed through 35. In starting the process I introduce by the aid of a pump (not shown) some gas, for instance hydrogen, carbon-dioxide or some other gas, incapable of producing an explosive mixture with the hydrocarbon vapors, for the purpose of eliminating the air out of the apparatus, or I produce purposely gas out of the introduced hydrocarbon in such a quantity that it fills the whole apparatus; any surplus of the gas I conduct to a gasholder (not shown) which communicates with the converter so as to keep the same during the process under a uniform gas pressure; the travel of the gas to the gasholder and from the same to the converter causes the products created in the latter to move, or travel, upwardly.

I have already pointed out above that my resistor bodies are hollow and for this reason they are made of carbon or of any suitable conductor, preferably a metal having a melting point which is higher than the highest temperature applied in the operation of my process. Moreover, as the increase in the temperature of an electrically heated metal is relative to the decrease of its thickness, or cross section, I prefer to make, therefore, the resistors of rather thin sheets of the conductive material because I bring the resistor in a very much shorter time to the desired temperature than if I apply a solid conductor. The cross-section of a solid conductor is infinitely larger and to heat the same to the desired temperature an amount of electric current is necessary that both technically and economically a process operated under such conditions is bound to result in failure.

I have already explained the technical shortcomings which even an enormous supply of electric energy would not overcome. Because there is no successful stopping of the technical deficiencies of the apparatus for converting hydrocarbons if the same includes resistors of a haphazard irregular size and shape, the operation of such a defectively constructed apparatus is all the more hopeless from the economical standpoint.

In this point the relation of the resistors of the prior art to my new type applied in my process is rather close to the relation existing between the heavy filaments in the first electric lamps and the fine carbon thread ultimately applied by Edison which ultimately made his electric lamp the only one economically possible.

Similarly my regularly sized and shaped resistors solve the problem of electrically heating a converter for the purposes of cracking hydrocarbons, because there is such a tremendous saving in electric energy in heating the equally thin walls of the resistors in the converter, but in addition hereto the flow of the electric current is equally distributed over the resistors, so that every square inch of the same is supplied with the same amount of heat as any other like unit of the surface of the resistor, and finally the film of hydrocarbons passing the resistors is acted upon exactly as at any other at any unit of the surface of the resistors at any part within the converter.

The converter can be considered to consist of an enormous complex of miniature heating zones formed by each individual resistor of a definite uniform shape, size and thickness of the wall.

Inasmuch as my new hollow resistors offer a double reaction surface as compared for instance with that of a solid material, as for instance coke (which even though porous, for the purposes of the present invention is practically a solid material), the action of the heat, radiating from the surface of the resistors, causes the hydrocarbons to move violently and in doing so constantly strike against other radiators to thereby gradually complete their conversion.

It is evident from the above that in this intensive method of heating the hydrocarbons there is a definite relation between the velocity and density of the hydrocarbons and the quantity of heat radiating from the resistor surface.

It is in the event that hydrocarbon vapors are too dense and pass too slowly through the converter, thus becoming liable to be too far decomposed, that I draw on the gas from the gas holder and admix it to the vapors in order to facilitate their passage through the numerous reaction zones with the velocity corresponding to the predetermined converting temperature. As the gas holder is in free communication with the whole system, the pressure remains constant and it is not disturbed by the gas circulation.

The gas circulation fulfills also another purpose, namely the prevention and elimination of a carbon deposit on the resistor surfaces. Many hydro-carbons are liable to cause a deposit of carbon if they are not hydrogenized. This deposit is apt to appear in those parts of the converter where the conversion has not yet proceeded sufficiently and where there is consequently little opportunity for hydrogenization on account of lack of hydrogen. For that reason the gas circulation is also recommended to keep the resistor surfaces free from carbon deposits.

It is further understood that the shape of the converter is not essential and that I may give to the same any suitable form, but a columnlike shape has been found very useful. Whether I introduce the hydro-carbons at the top or at the bottom of the converter and whether I arrange the conduits for the moving gases so that the same is pressed or sucked through the apparatus is immaterial inasmuch as all these technical details are within the routine of the chemical engineer and can be arranged as the convenience of the situation requires.

According to the nature of the hydrocarbons to be converted I prefer to operate the process at varying temperatures; if, for instance I want to convert a hydro-carbon distilling at 260° C., I maintain the converting temperature at about 360° C. for an oil distilling at 420° C. at about 440° C. and I found that a temperature range of from 360–440° C. appears sufficient to treat the various kinds of oil of the market.

The generated hydro-carbons, which condense in the dephlegmater and are not carried away to the cooler by the moving means, i. e. the non-condensible gases specially admitted into the converter, are returned to the same and undergo the process once more, either alone or mixed with other raw material, to be thus alternately fractionally cracked and distilled.

The heavier hydro-carbons, which are produced by the process and which have a boiling point higher than the temperature of the process, flow to the lower part of the converter from where they can be removed through the outlet 35.

It is understood that I can combine any number of converters with each other and that I may heat each single converter to a different temperature.

When I speak of electrically heating the resistance bodies it is understood that I may effect this also by induction current, which change is within the skill of the electrical engineer and therefore is here not further gone into.

Having described my invention, what I claim as new and desire to secure by Letters Patent is:

In a hydrocarbon oil cracking apparatus in which the cracking element comprises a container filled with conductive bodies of substantially uniform size, shape and thickness and having maximum exposed inner and outer surfaces packed so as to make continuous contact throughout, the process comprising the passing of the hydrocarbon oil through such bodies so as to obtain a continuous broken filming thereof, simultaneously conducting an electrical current through said bodies so as to heat them to a cracking temperature to obtain lower boiling hydrocarbons, continuously withdrawing cracked vapors and gases from the top of said apparatus and withdrawing residual oil from the bottom thereof.

In testimony whereof I have signed my name to this specification.

LOUIS GEORG LEFFER.